US012649336B2

(12) United States Patent

Neau

(10) Patent No.: US 12,649,336 B2
(45) Date of Patent: Jun. 9, 2026

(54) TIRE TREAD FOR A HEAVY VEHICLE WITH AN IMPROVED RESISTANCE TO STRESSES

(71) Applicant: COMPAGNIE GENERALE DES ETABLISSEMENTS MICHELIN, Clermont-Ferrand (FR)

(72) Inventor: Xavier Neau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 96 days.

(21) Appl. No.: 18/009,611

(22) PCT Filed: Jun. 7, 2021

(86) PCT No.: PCT/FR2021/051017
§ 371 (c)(1),
(2) Date: Dec. 9, 2022

(87) PCT Pub. No.: WO2021/250344
PCT Pub. Date: Dec. 16, 2021

(65) Prior Publication Data
US 2023/0219374 A1 Jul. 13, 2023

(30) Foreign Application Priority Data
Jun. 10, 2020 (FR) ...................................... 2006067

(51) Int. Cl.
*B60C 11/11* (2006.01)
*B60C 11/12* (2006.01)
(Continued)

(52) U.S. Cl.
CPC .......... *B60C 11/124* (2013.01); *B60C 11/125* (2013.01); *B60C 11/1272* (2013.01); *B60C 2011/0353* (2013.01); *B60C 2200/06* (2013.01)

(58) Field of Classification Search
CPC . B60C 11/124; B60C 11/1272; B60C 11/125; B60C 2011/0353
See application file for complete search history.

(56) References Cited

U.S. PATENT DOCUMENTS

2002/0092591 A1* 7/2002 Cortes ................. B60C 11/0309
152/209.16
2010/0269967 A1* 10/2010 Maruoka ............... B60C 9/2006
152/209.16
(Continued)

FOREIGN PATENT DOCUMENTS

EP 3028877 6/2016
EP 3269567 1/2018
(Continued)

OTHER PUBLICATIONS

Machine translation for Japan 2001-287511 (Year: 2024).*
(Continued)

*Primary Examiner* — Steven D Maki
(74) *Attorney, Agent, or Firm* — COZEN O'CONNOR

(57) ABSTRACT

A tread for a tire for a heavy-duty vehicle for mixed use and aims to improve the endurance of the crown of the tire following retention of stones in the tread. The tread (1) has voids (3) with a first, radially outer void portion (31) of groove type, having a width W11 on the tread surface (2), a width W12 at a groove bottom (311), and a depth H1, and a second, radially inner void portion (32) of sipe type, having a width W2 and a depth H2 and leading into the groove bottom (311) at a distance E with respect to the mean surface (S1) of the groove (31). The distance E is at least equal to the width W12 of the groove bottom (311) divided by 6.

8 Claims, 2 Drawing Sheets

(51) Int. Cl.
  _B60C 11/13_    (2006.01)
  _B60C 11/03_    (2006.01)

(56)      References Cited

U.S. PATENT DOCUMENTS

| | | | |
|---|---|---|---|
| 2013/0075001 | A1 | 3/2013 | Yasunaga |
| 2014/0158261 | A1* | 6/2014 | Takahashi ........... B60C 11/0306 |
| | | | 152/209.1 |
| 2016/0159163 | A1 | 6/2016 | Kishida |
| 2016/0272012 | A1* | 9/2016 | Morgan ................. B29D 30/52 |
| 2018/0015790 | A1 | 1/2018 | Oji |
| 2018/0264889 | A1 | 9/2018 | Nakamata |
| 2019/0168546 | A1* | 6/2019 | Jones .................. B60C 11/0323 |
| 2019/0232722 | A1* | 8/2019 | Becker ................ B60C 11/1353 |
| 2022/0088967 | A1* | 3/2022 | Spaccapietra ......... B60C 11/042 |

FOREIGN PATENT DOCUMENTS

| | | | | | |
|---|---|---|---|---|---|
| JP | H05131812 | | 5/1993 | | |
| JP | 06-024212 | A | * 2/1994 | | |
| JP | 10-264613 | A | * 10/1998 | ........... | B60C 11/125 |
| JP | 2001-287511 | A | * 10/2001 | ........... | B60C 11/125 |
| JP | 2003-011619 | A | * 1/2003 | ........... | B60C 11/125 |
| KR | 2009-0053384 | A | * 5/2009 | ........... | B60C 11/125 |

OTHER PUBLICATIONS

Machine translation for Japan 2003-011619 (Year: 2024).*
Machine translation for Korea 2009-0053384 (Year: 2024).*
Machine translation for Japan 10-264613 (Year: 2024).*
Machine translation for Japan 06-024212 (Year: 2025).*

* cited by examiner

TIRE TREAD FOR A HEAVY VEHICLE WITH AN IMPROVED RESISTANCE TO STRESSES

RELATED APPLICATIONS

This is a U.S. National Phase Application under 35 USC 371 of International Application PCT/FR2021/051017 filed on Jun. 7, 2021.

This application claims the priority of French application no. FR 2006067 filed Jun. 10, 2020, the entire content of all of which is hereby incorporated by reference.

FIELD OF THE INVENTION

A subject of the present invention is a tire tread for a heavy-duty vehicle intended for mixed use, that is to say able to run on tarmac surfaces or stony surfaces.

BACKGROUND OF THE INVENTION

A tread, positioned on the circumference of the tire and made of at least one rubber-based material, is intended to wear when making contact with the ground via a tread surface. It generally comprises a tread pattern, which is a system of voids separating elements in relief and is intended to provide the grip of the tire on hard ground, loose ground or ground that is possibly covered with water, snow or mud.

A tread can be defined in geometric terms by three dimensions: a thickness, in a radial direction; a width, in a transverse direction; and a length, in a longitudinal direction.

These geometric features of the tread are measured on the tire as follows:

the thickness is the radial distance between the tread surface and a bottom surface, which is substantially parallel to the tread surface and passes through the bottom of the deepest void, the width is the transverse distance between the end points of the tread surface when it is in contact with hard ground under the action of pressure and load conditions applied to the tire as specified, for example, by the standards of the "European Tire and Rim Technical Organisation" or ETRTO, the length is equal to the outer circumference of the tire.

When the tire is running on a ground, the tread is subject to abrasive loading caused by indenting elements on the ground, which cause a gradual reduction in its thickness as a result of wear. Furthermore, the voids of the tread are liable to trap stones present on the ground, which can either be ejected during running or migrate towards the void bottom and generate cracks liable to propagate from the void bottom into the tread as far as a crown reinforcement of the tire. These cracks can in time cause the crown of the tire to deteriorate, reducing the endurance and the service life of the tire and consequently necessitating its premature removal.

The voids of the tread can be of two types: grooves and sipes. The grooves delimit elements in relief that can deform without coming into contact with one another when the tread enters the contact patch with the ground. The sipes, which are narrower than the grooves, have a width such that the opposing walls of the elements in relief that delimit them come at least partially into contact with one another when the tread enters the contact patch. To determine the possibility or otherwise of contact between the walls of a void, the pressure and loading conditions applied to the tire are those specified, for example, by the ETRTO standards. The grooves, which are the widest voids, are most likely to retain the largest stones that are liable to migrate and attack the tread.

To reduce the impact of the retention and migration of stones in the voids of the tread, and more particularly in the grooves, tire designers have installed rubber protuberances in the void bottoms, referred to as bridges. A bridge, installed in a void, therefore connects the two elements in relief that delimit the void and thus locally stiffens the elements in relief, in particular when they are subject to shear stresses transverse to the mean direction of the void. A bridge may be either continuous, or discontinuous, in the mean direction of the void in which it is installed or in a direction perpendicular to this mean direction. It may also have a height which is larger or smaller than the depth of the void.

Introducing a discontinuity in a bridge, in the form of at least one sipe extending in the mean direction of the void in which the bridge is positioned, makes it possible to ensure flexibility of the bridge and therefore a flexible connection between the elements in relief, this contributing, in particular, to limiting the wear of said elements in relief. A first type of discontinuous bridge that is known comprises a single sipe that leads into the void and is positioned in the centre of the bridge at a substantially equal distance from each element in relief. In this first type of bridge, it has been noted that the presence of a sipe centred on the bridge is likely to reduce the protective performance of the void bottom by the bridge, since stones are liable to migrate into the sipe. A second type of discontinuous bridge that is known comprises two sipes leading into the void, each sipe being positioned at the join between the bridge and one of the two elements in relief. Owing to the presence of a sipe at each of its ends, this second type of bridge has the drawback of not connecting the two elements in relief that border it and therefore of not effectively functioning as a bridge.

The presence of a sipe in a bridge implies that the void has a stepped structure, comprising a first, radially outer, wide-void portion, of groove type, leading onto the tread surface and a second, radially inner, narrow-void portion, of sipe type, leading into the groove.

SUMMARY OF THE INVENTION

The inventors have set themselves the objective of increasing the endurance of the crown of a tire for a heavy-duty vehicle, comprising a tread having recesses with siped bridges, by reducing the risk of migration of stones trapped in its voids while the tire is running.

Said objective has been achieved by a tread for a tire for a heavy-duty vehicle, said tread being intended to come into contact with the ground via a tread surface and comprising voids that are delimited by elements in relief with respect to a bottom surface and extend over a specific length, at least one void comprising, over at least some of its length, a first, radially outer void portion leading into the tread surface, and a second, radially inner void portion leading into the first void portion, the first void portion being a groove having a width $W11$, measured on the tread surface perpendicularly to a mean surface of the groove, and having a depth $H1$, measured perpendicularly from the tread surface to a groove bottom having a width $W12$, the second void portion being a sipe having a width $W2$, measured perpendicularly to a mean surface of the sipe, and having a depth $H2$, measured perpendicularly from the groove bottom to a sipe bottom, the sipe leading into the groove bottom at a distance E, measured between the mean surface of the groove and the mean surface of the sipe, the distance E at which the sipe leads into the groove bottom being at least equal to the width W12 of the groove bottom divided by 6.

Essentially, according to an embodiment of the invention, when a tread for a tyre for a heavy-duty vehicle comprises voids that have a bottom provided with a siped bridge, that is to say with a bridge comprising a single sipe extending in the mean direction of the void, this sipe leads onto a radially outer face of the bridge, eccentrically with respect to a mean surface of the void. This eccentricity is defined by a distance E between the mean surface of the void and the intersection of the mean surface of the sipe with the radially outer face of the bridge, said face corresponding to the bottom of the first void portion, of groove type, radially on the outside of the bridge. According to the invention, the distance E is at least equal to the width W12 of the groove bottom divided by 6, this meaning that the sipe leads to the outside of the central third of the bridge.

In other words, the void with siped bridge can be described as a stepped void comprising a first, radially outer void portion of groove type that is delimited by two elements in relief and leads into the tread surface, and a second, radially inner void portion of sipe type that passes at least partially through the bridge and leads into the first void portion on the radially outer face of the bridge. The total depth of the stepped void is the radial distance between the tread surface and the bottom of the void.

The first, radially outer void portion is a groove having walls that cannot come into contact with one another when the tread enters the contact patch with the ground. It extends along a mean surface substantially perpendicular to the tread surface. The first void portion has a width W11 on the tread surface, and a width W12 at its bottom, measured perpendicularly to the mean surface and between the opposite walls of the elements in relief delimiting the groove, respectively. The first void portion has a depth H1 measured perpendicularly from the tread surface to the groove bottom. In other words, the depth H is the maximum radial distance between the tread surface and the bottom of the groove.

The second, radially inner void portion is a sipe having walls that come into contact with one another at least partially when the tread enters the contact patch with the ground. It extends along a mean surface that may be inclined, and therefore not necessarily perpendicular, with respect to the bottom of the groove. The second void portion has a width W2, measured between the walls of the sipe perpendicularly to a mean surface of the sipe, and a depth H2, measured perpendicularly from the groove bottom to a sipe bottom. In other words, the depth H2 is the radial distance between the groove bottom and the sipe bottom. The width W2 of the sipe is substantially constant overall over the entire depth H2 and can therefore be measured at any radial level between the groove bottom and the sipe bottom.

The distance E at which the sipe leads into the groove bottom is consequently the distance between the intersection of the mean surface of the groove with the groove bottom and the intersection of the mean surface of the sipe with the groove bottom.

The advantage of such an eccentric sipe in the bridge is to reduce the probability of migration of a stone trapped in the groove, since the path of a stone initially in the axis of the groove is deflected by the eccentricity of the sipe. Therefore, the probability of migration of the stone into the sipe is reduced and the stone is potentially blocked at the groove, or even ejected from the void. Consequently, the risk of attack on the crown reinforcement, radially on the inside of the tread, is reduced and its endurance is increased, and therefore the service life of the tire is lengthened.

Advantageously, the distance E is at most equal to half of the width W12 of the groove bottom. The greater the distance E, the more the path of the stone is deflected, this involving a reduction in the risk of the stone migrating into the sipe. When the distance E is equal to half of the width W12 of the groove bottom, the sipe leads into the base of one of the two elements in relief delimiting the groove, this being the limit position of the open end of the sipe.

With preference, the width W11 of the groove is at least equal to the width W12 of the groove bottom. This condition implies that the walls of the groove are not radial and that, in a radial plane perpendicular to the mean direction of the groove, the groove has a trapezoidal cross section, the large base of which is the part leading into the tread surface and the small base of which is the bottom of the groove. This trapezoidal cross section facilitates the ejection of stones while the tire is running by creating an ejection cone, and also facilitates the manufacture of the tire, more specifically the removal of the void from the mould after the tire has been cured.

With further preference, the width W11 of the groove is at least equal to 4 mm Below this value, the groove no longer acts as a groove that does not make contact with itself, and there is no longer a risk of stones being retained and therefore migrating.

In addition, the ratio W11/W12 must be limited, typically at most equal to 3. This condition limits the inclination of the walls of the groove, and therefore limits the volume of the groove, this ensuring, with respect to the elements in relief delimiting the groove, a volume of material to be worn down that is enough for the tread to have good wear performance.

The depth H1 of the groove is advantageously at least equal to 0.5 times the depth H2 of the sipe. In other words, the depth H1 of the groove is at least equal to one third of the total depth H of the void, defined as the sum of the depth H1 of the groove and the depth H2 of the sipe. This is a normal design range ensuring a volume of grooves that is sufficient in terms of grip.

The depth H1 of the groove is more advantageously at most equal to twice the depth H2 of the sipe. In other words, the depth H1 of the groove is at most equal to two thirds of the total depth H of the void, defined as the sum of the depth H1 of the groove and the depth H2 of the sipe. This is a normal design range ensuring a bridge height that is sufficient in terms of protecting the void bottom.

With preference, the width W2 of the sipe is at most equal to 2 mm Above this value, the sipe no longer acts as a sipe, since its walls no longer come into contact with one another.

With further preference, the width W2 of the sipe is at least equal to 0.4 mm. The value of 0.4 mm is a technological manufacturing minimum, below which it becomes problematic to produce a sipe blade for moulding the sipe.

It is advantageous for the sipe to have a mean surface forming an angle D at most equal to 15° with respect to a radial direction perpendicular to the tread surface. An inclination of the mean surface of the sipe makes it possible to slow down the migration of a stone into it, in the knowledge that the preferred migration direction of a stone is a priori radial. In addition, giving an upper limit of 15° to this inclination facilitates substantially radial removal from the mould when the tire has finished curing.

The sipe bottom advantageously has a rounded contour having a minimum radius R at least equal to 1.5 times the width W2 of the sipe. This rounding at the groove bottom, usually referred to as "droplet" by designers, is an anti-cracking device which delays the onset of cracking at the sipe bottom by reducing the local stresses.

According to a particular embodiment, the mean surface of the groove forms an angle at most equal to 45° with the longitudinal direction. In other words, the groove, and therefore the stepped void of which it is the first, radially outer portion, is substantially longitudinal, that is to say longitudinal or oblique with an inclination of its mean surface of less than or equal to 45° with respect to the longitudinal direction. This is because such a longitudinal or oblique void traps a stone more easily, due to its orientation substantially parallel to the running direction of the tire; hence the advantage of a bridge according to the invention in this type of void.

According to a preferred variant of a substantially longitudinal void as defined above, the void is continuous over the entire length of the tread. A substantially longitudinal void comprising a bridge according to the invention over the entire length of the tread is thus protected effectively in terms of the retention of stones over the entire circumference of the tire.

According to another particular embodiment, the mean surface of the groove forms an angle at most equal to 45° with the transverse direction. In other words, the groove, and therefore the stepped void of which it is the first, radially outer portion, is substantially transverse, that is to say transverse or oblique with an inclination of its mean surface of less than or equal to 45° with respect to the transverse direction.

According to a preferred variant of a substantially transverse void as defined above, the void is positioned in a median portion of the tread having a width preferably equal to the width of the tread divided by 3. Since a transverse void, by convention, is a void having a mean surface which forms an angle at most equal to 45° with the transverse direction, therefore closer to the transverse direction than the longitudinal running direction, the ejection of stones from the transverse voids is specifically more difficult. Consequently, when a tread comprises transverse voids in its median portion, usually defined as the central third of the tread, it is particularly advantageous for these voids to be protected by a siped bridge according to the invention, since this tread portion is subject to high contact pressures, this promoting the possible collection of stones present in the contact patch of the tire with the ground.

Another subject of the invention is a tire for a heavy-duty vehicle, said tire comprising a tread according to any one of the embodiments described above.

BRIEF DESCRIPTION OF THE DRAWINGS

The features of the invention are illustrated in the following schematic FIGS. 1 to 3, which are not shown to scale.

DETAILED DESCRIPTION OF THE DRAWINGS

Figure 1:
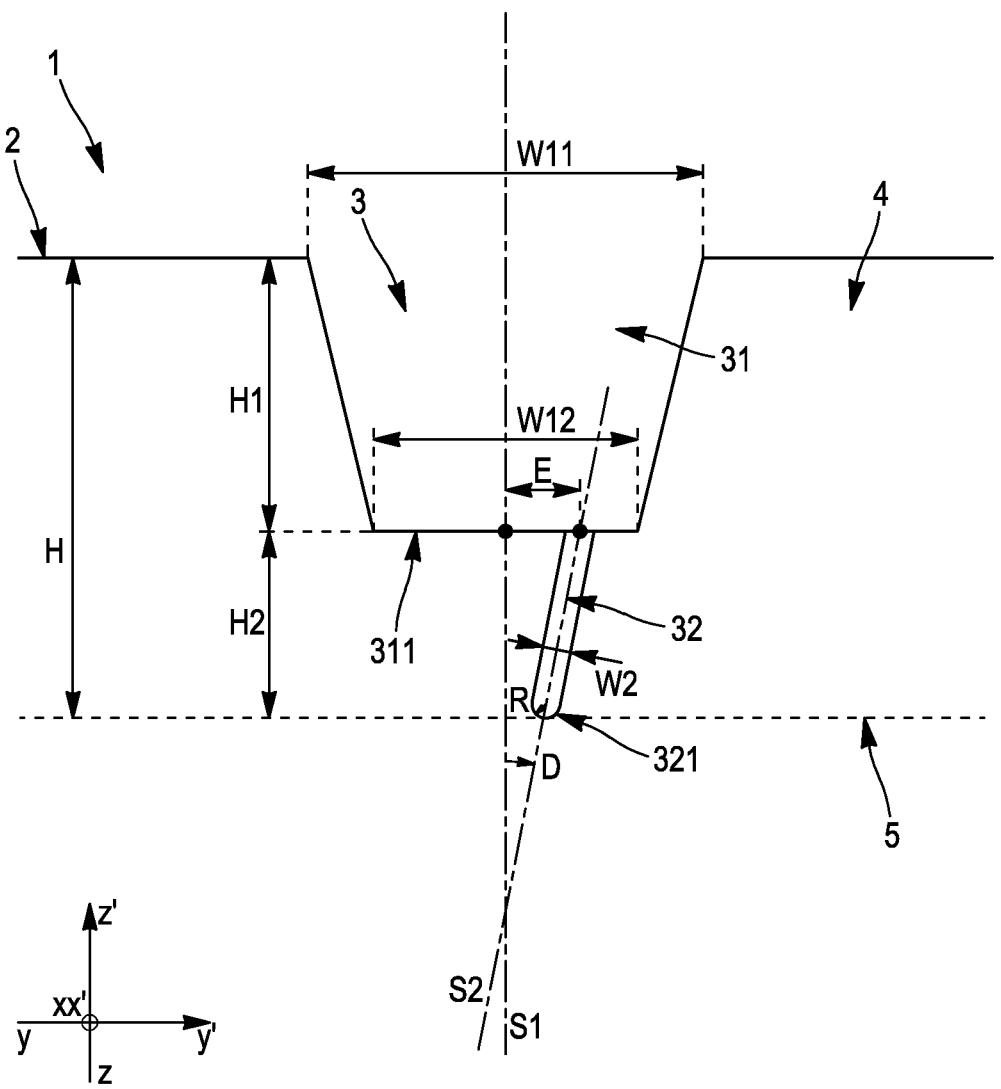
FIG. 1: View in radial section of a stepped void according to the invention.

FIG. 1 is a view in radial section of a stepped void according to the invention. The radial section is made through a plane defined by the radial direction zz' and a direction yy', which is perpendicular to a mean direction of the void xx'. The void 3 of the tread 1 for a tire for a heavy-duty vehicle, which tread is intended to come into contact with the ground via a tread surface 2, is delimited by elements 4 in relief with respect to a bottom surface 5 and extends over a specific length. The void 3 comprises, over at least some of its length, a first, radially outer void portion 31 leading into the tread surface 2, and a second, radially inner void portion 32 leading into the first void portion 31. The first void portion 31 is a groove having a width W11, measured on the tread surface 2 perpendicularly to a mean surface S1 of the groove 31, and having a depth H1, measured perpendicularly from the tread surface 2 to a groove bottom 311 having a width W12. The second void portion 32 is a sipe having a width W2, measured perpendicularly to a mean surface S2 of the sipe 32, and having a depth H2, measured perpendicularly from the groove bottom 311 to a sipe bottom 321. The sipe 32 leads into the groove bottom 311 at a distance E, measured between the mean surface S1 of the groove 31 and the mean surface S2 of the sipe 32. According to the invention, the distance E at which the sipe 32 leads into the groove bottom 311 is at least equal to the width W12 of the groove bottom 311 divided by 6. In the embodiment shown in FIG. 1, the sipe 32 has a mean surface S2 forming an angle D at most equal to 15° with respect to a radial direction zz' perpendicular to the tread surface 2. In addition, the sipe bottom 321 has a rounded contour having a minimum radius R at least equal to 1.5 times the width W2 of the sipe 32.

Figure 2:
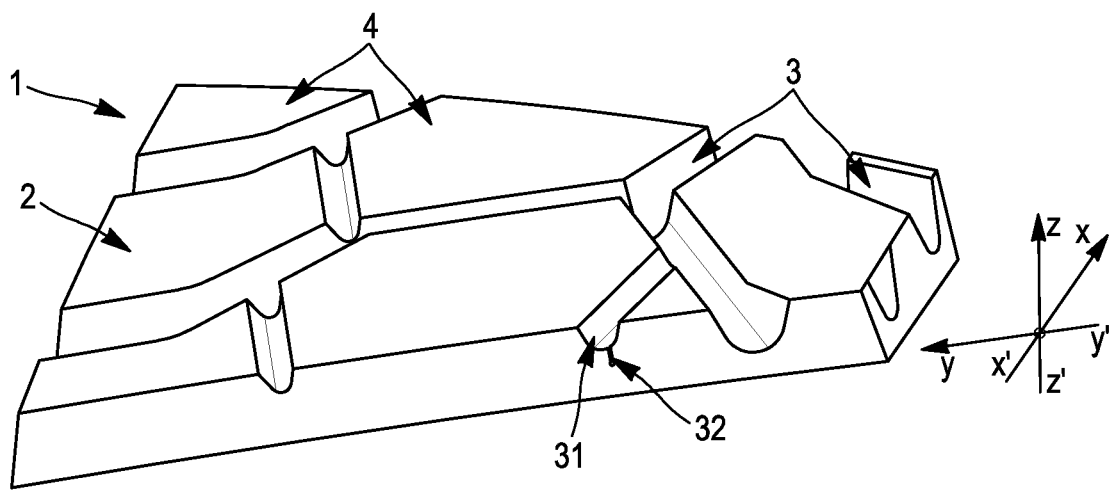
FIG. 2: Perspective view of an exemplary portion of tread according to the invention.

FIG. 2 is a perspective view of an exemplary portion of tread 1 according to the invention. The directions shown in the figure are respectively the circumferential direction XX', the transverse direction YY', and a radial direction ZZ' of the tread. FIG. 2 shows a portion of tread 1 for a tire for a heavy-duty vehicle, which tread is intended to come into contact with the ground via a tread surface 2 and comprises voids 3, according to the invention, that are delimited by elements 4 in relief with respect to a bottom surface 5. At least some of the voids 3, in particular the substantially longitudinal voids 3, comprise a first, radially outer void portion 31 leading into the tread surface 2, and a second, radially inner void portion 32 leading into the first void portion 31. The tread 2 also comprises substantially transverse voids 3 that are positioned in a median portion and in two lateral portions, said substantially transverse voids leading into the substantially longitudinal voids. The tread pattern of such a tread is therefore a block tread pattern which is particularly suited for use on a driven axle of a heavy-duty vehicle.

Figure 3:
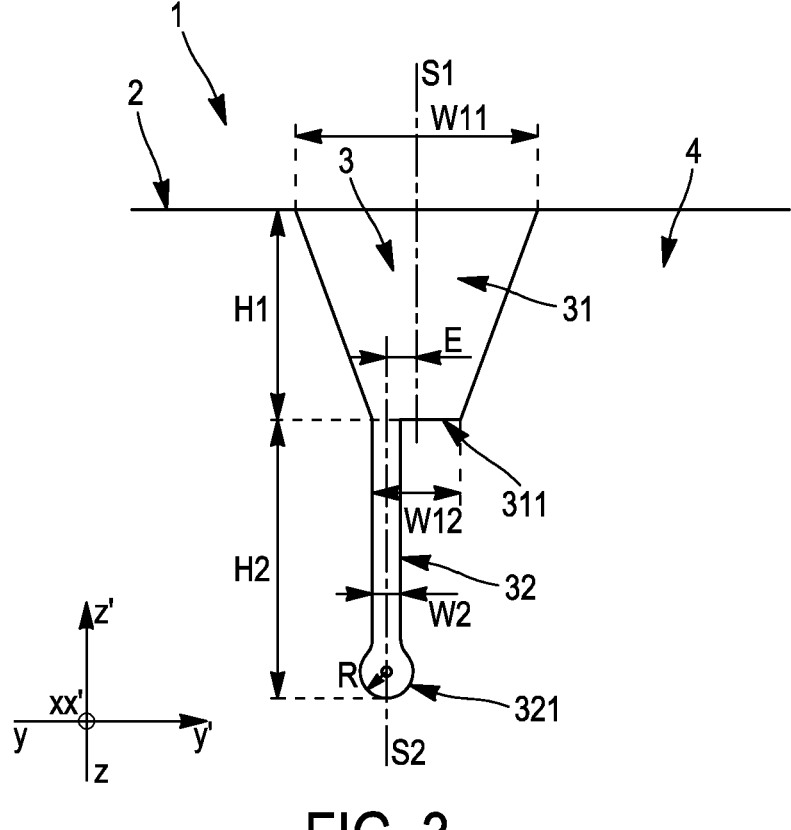
FIG. 3: View in radial section of a stepped void from the exemplary portion of tread according to the invention, shown in FIG. 2.

FIG. 3 is a view in radial section of a stepped void from the exemplary portion of tread according to the invention, as shown in FIG. 2. Said radial section is made through a plane defined by the radial direction zz' and a direction yy', which is perpendicular to a mean direction of the void xx'. The directions xx', yy' and zz' define a local frame of reference relative to the void under consideration, the local radial direction zz' corresponding to the radial direction ZZ' of the tread, as shown in FIG. 2. The features shown in FIG. 2 are identical to those in FIG. 1. In the particular case that is shown, the sipe 32 leads into the groove bottom 311 at a distance E with respect to the mean surface S1 of the groove 31 that is equal to half of the width W12 of the groove bottom 311, that is to say at the wall base with maximum eccentricity. Moreover, the sipe 32 is perpendicular to the groove bottom 311, this meaning that its mean surface S2 is parallel to the mean surface S1 of the groove 31.

The exemplary tread shown in FIGS. 2 and 3 is an example which has been studied by the inventors for the tire size 13R22.5, for a mixed-use tire more particularly intended to be fitted to a driven axle. This tire is intended to bear a load equal to 4000 kg, for an inflation pressure equal to 8.6 bar, in accordance with the "Standards Manual 2019" of the ETRTO standard.

Table 1 below shows the characteristics of the tread which was tested:

TABLE 1

| Characteristics | Values |
| --- | --- |
| Width W11 of the groove 31 | 10.4 mm |
| Width W12 of the groove 31 | 4 mm |
| Height H1 of the groove 31 | 10 mm |
| Width W2 of the sipe 32 | 0.8 mm |
| Height H2 of the sipe 32 | 11.2 mm |
| Inclination D of the sipe 32 | 0° |
| Distance E | 2 mm |

The tread according to the invention, which was developed for a conventional tire subject to inflation pressure, may also be used for a non-pneumatic tire, but also for any non-pneumatic rolling assembly with which a vehicle is intended to be equipped.

The scope of protection of the invention is not limited to the examples given hereinabove. The invention is embodied in each novel characteristic.

The invention claimed is:

1. A tread for a tire for a heavy-duty vehicle, which tread is intended to come into contact with ground via a tread surface and comprises voids that are delimited by elements in relief with respect to a bottom surface and extend over a specific length, at least one void having a depth H and comprising, over at least some of its length, a first, radially outer void portion leading into the tread surface, and a single second, radially inner void portion leading into the first void portion, the first void portion being a groove having a trapezoidal cross section and having a width W11, measured on the tread surface perpendicularly to a mean surface (S1) of the groove, and having a depth H1, measured perpendicularly from the tread surface to a groove bottom, which is planar, having a width W12, the single second void portion being a sipe having a width W2, measured perpendicularly to a mean surface of the sipe, and having a depth H2, measured perpendicularly from the groove bottom to a sipe bottom, the sipe bottom having a rounded contour having a radius R equal to 1.5 times the width W2 of the sipe, the depth H1 of the groove being at least equal to 0.5 times the depth H2 of the sipe and at most equal to twice the depth H2 of the sipe and the depth of the void H is equal to a sum of the depth of the first void portion H1 and the depth of the single second void portion H2, the sipe leading into the groove bottom at a distance E, measured between the mean surface (S1) of the groove and the mean surface (S2) of the sipe, wherein the distance E at which the sipe leads into the groove bottom is at least equal to the width W12 of the groove bottom divided by 6, wherein the mean surface (S1) of the groove forms an angle at most equal to 45° with the transverse direction (YY'), wherein the trapezoidal cross section of the first void portion comprises side walls between the tread surface and the groove bottom that taper radially inward towards one another at opposite acute angles with respect to the mean surface (S1) of the groove.

2. The tread according to claim 1, wherein the distance E is at most equal to half of the width W12 of the groove bottom.

3. The tread according to claim 1, wherein the width W11 of the groove is at least equal to 4 mm.

4. The tread according to claim 1, wherein the width W2 of the sipe is at most equal to 2 mm.

5. The tread according to claim 1, wherein the width W2 of the sipe is at least equal to 0.4 mm.

6. The tread according to claim 1, wherein the sipe has a mean surface (S2) forming an angle D at most equal to 15° with respect to a radial direction (ZZ') perpendicular to the tread surface.

7. The tread according to claim 1, wherein the void is positioned in a median portion of the tread having a width equal to the width of the tread divided by 3.

8. A heavy-duty vehicle tire, comprising the tread according to claim 1.

* * * * *